US008418973B2

(12) United States Patent
Liu et al.

(10) Patent No.: US 8,418,973 B2
(45) Date of Patent: Apr. 16, 2013

(54) MULTI-AXIS PHOTOGRAPHIC TRIPOD HEADS

(75) Inventors: Hao Liu, Zhongshan (CN); Robert M. Rose, Woodcliff Lake, NJ (US)

(73) Assignee: Mamiya America Corporation, North White Plains, NY (US)

( * ) Notice: Subject to any disclaimer, the term of this patent is extended or adjusted under 35 U.S.C. 154(b) by 512 days.

(21) Appl. No.: 12/708,989

(22) Filed: Feb. 19, 2010

(65) Prior Publication Data

US 2011/0006170 A1 Jan. 13, 2011

(30) Foreign Application Priority Data

Jul. 7, 2009 (CN) .......................... 2009 1 0040926

(51) Int. Cl.
*F16M 11/02* (2006.01)

(52) U.S. Cl.
USPC .................. 248/183.2; 248/176.1; 248/179.1; 248/187.1; 248/184.1; 396/428

(58) Field of Classification Search ............... 248/176.1, 248/183.2, 168, 179.1, 181.1, 187.1; 396/428
See application file for complete search history.

(56) References Cited

U.S. PATENT DOCUMENTS

| | | | |
|---|---|---|---|
| 1,803,534 A | 5/1931 | Voldemar | |
| 1,870,766 A | 8/1932 | Beistle | |
| 2,168,988 A | 8/1939 | Hultquist | |
| 2,231,783 A | 2/1941 | Tresslar et al. | |
| 2,261,426 A | 11/1941 | Wilcox | |
| 2,318,633 A * | 5/1943 | Ries | 248/183.2 |
| 2,548,659 A | 4/1951 | Epprecht | |
| 2,556,598 A | 6/1951 | Rasine | |
| 2,882,001 A | 4/1959 | Ries et al. | |
| 2,883,875 A | 4/1959 | Davidson | |
| 2,940,709 A | 6/1960 | Neuwirth | |
| 2,956,764 A | 10/1960 | Nakatani | |
| 2,962,251 A | 11/1960 | Karpf | |
| 3,109,617 A | 11/1963 | Meyer | |
| 3,128,982 A * | 4/1964 | Christopher | 248/183.2 |
| 3,356,325 A * | 12/1967 | Schnase | 248/187.1 |
| 3,423,056 A | 1/1969 | Welt | |
| 3,592,429 A | 7/1971 | Miller et al. | |

(Continued)

FOREIGN PATENT DOCUMENTS

| | | |
|---|---|---|
| CH | 325 873 A | 11/1957 |
| CN | 93200873.9 | 1/1993 |

(Continued)

OTHER PUBLICATIONS

International Search Report issued by the Korean Intellectual Propery Office along with the Written Opinion, Feb. 22, 2011.

*Primary Examiner* — Terrell McKinnon
*Assistant Examiner* — Daniel J Breslin
(74) *Attorney, Agent, or Firm* — Gottlieb, Rackman & Reisman, PC

(57) ABSTRACT

A tripod head comprises a tripod mounting component, an angle adjusting component, and a camera mounting component. The angle adjusting component is configured to allow adjustment and locking of the angle between the tripod mounting component and the camera mounting component about first and second perpendicular axes. The camera mounting component is rotatably mounted to the angle adjusting component to allow the camera mounting component to be rotated and locked with respect to the angle adjusting component about a third axis.

4 Claims, 9 Drawing Sheets

U.S. PATENT DOCUMENTS

| | | | |
|---|---|---|---|
| 3,712,571 | A | 1/1973 | Miller et al. |
| 3,822,769 | A | 7/1974 | O'Connor |
| 4,085,915 | A * | 4/1978 | Song et al. ............... 248/187.1 |
| 4,234,149 | A | 11/1980 | Kawazoe |
| 4,249,817 | A * | 2/1981 | Blau ........................... 396/428 |
| 4,256,279 | A * | 3/1981 | Duel ........................... 248/184.1 |
| 4,457,610 | A | 7/1984 | Kawazoe |
| 4,533,103 | A | 8/1985 | Ina |
| 4,562,985 | A | 1/1986 | Nakatani |
| 4,697,772 | A | 10/1987 | Kosugi et al. |
| 4,736,217 | A | 4/1988 | McDowell |
| 4,886,230 | A | 12/1989 | Jones et al. |
| 4,929,973 | A | 5/1990 | Nakatani |
| 4,932,622 | A | 6/1990 | Hayakawa |
| 4,959,671 | A | 9/1990 | Isikawa |
| 4,988,064 | A | 1/1991 | Hoshino |
| 5,003,328 | A | 3/1991 | Gaynor |
| 5,012,265 | A | 4/1991 | Nakatani |
| 5,078,355 | A | 1/1992 | Fujimoto |
| 5,082,221 | A | 1/1992 | Lai |
| 5,083,147 | A | 1/1992 | Nakatani |
| 5,137,236 | A | 8/1992 | Burns |
| 5,165,635 | A | 11/1992 | Hoshino |
| 5,202,527 | A | 4/1993 | Gracie |
| 5,267,712 | A | 12/1993 | Shen |
| 5,288,044 | A | 2/1994 | Chen |
| 5,310,145 | A | 5/1994 | Chen |
| 5,333,023 | A | 7/1994 | Oxford |
| 5,341,185 | A | 8/1994 | Nakatani |
| 5,365,293 | A | 11/1994 | Nakatani |
| 5,397,086 | A * | 3/1995 | Chen ........................... 248/183.2 |
| 5,509,629 | A | 4/1996 | Sassmannshausen et al. |
| 5,510,863 | A * | 4/1996 | Kliewer ........................ 396/428 |
| 5,785,286 | A | 7/1998 | Hiesinger et al. |
| 5,839,704 | A | 11/1998 | Appleman |
| 5,870,641 | A | 2/1999 | Chrosziel |
| 5,934,628 | A | 8/1999 | Bosnakovic |
| 6,196,504 | B1 | 3/2001 | Lemke |
| 6,435,738 | B1 | 8/2002 | Vogt |
| 6,536,723 | B1 | 3/2003 | Nakatani |
| 6,546,637 | B2 | 4/2003 | Fischer |
| 6,644,871 | B2 | 11/2003 | Nakatani |
| 6,702,482 | B2 | 3/2004 | Sherwin |
| 6,712,322 | B2 | 3/2004 | Nakatani |
| 6,739,559 | B2 | 5/2004 | Nakatani |
| 6,748,873 | B2 | 6/2004 | Brown, Sr. |
| 6,761,501 | B1 | 7/2004 | Nakatani |
| 6,773,172 | B1 | 8/2004 | Johnson et al. |
| 6,820,844 | B2 | 11/2004 | Tiffen et al. |
| 6,827,319 | B2 | 12/2004 | Mayr |
| 6,830,227 | B2 | 12/2004 | Nakatani |
| 6,896,227 | B2 | 5/2005 | Ku |
| 6,983,916 | B2 | 1/2006 | Raynaud |
| 6,991,384 | B1 | 1/2006 | Davis |
| 7,000,875 | B2 | 2/2006 | Pernstich et al. |
| 7,007,909 | B2 | 3/2006 | Hsieh |
| 7,011,280 | B2 | 3/2006 | Murray et al. |
| 7,047,960 | B2 | 5/2006 | McCrea |
| 7,077,582 | B2 | 7/2006 | Johnson |
| 7,229,053 | B2 | 6/2007 | Speggiorin |
| 7,303,171 | B1 * | 12/2007 | Chen ........................ 248/184.1 |
| 7,364,125 | B2 | 4/2008 | Speggiorin |
| 7,670,066 | B2 * | 3/2010 | Araki ........................... 396/428 |
| 7,771,131 | B2 * | 8/2010 | Scott ............................ 396/428 |
| 7,828,256 | B2 * | 11/2010 | Speggiorin ................. 248/187.1 |
| 8,021,060 | B2 * | 9/2011 | Sudhana et al. ............. 396/428 |
| 8,075,203 | B2 * | 12/2011 | Johnson ....................... 396/428 |
| 2002/0056794 | A1 | 5/2002 | Ibrahim |
| 2006/0086869 | A1 | 4/2006 | Hsieh |
| 2006/0175482 | A1 | 8/2006 | Johnson |
| 2006/0175483 | A1 | 8/2006 | Osaka |
| 2006/0175484 | A1 | 8/2006 | Wood, III et al. |
| 2006/0177215 | A1 * | 8/2006 | Johnson ....................... 396/419 |
| 2007/0090237 | A1 | 4/2007 | Hsu |
| 2008/0078914 | A1 | 4/2008 | Liao |
| 2008/0111036 | A1 | 5/2008 | Cartoni et al. |
| 2008/0224000 | A1 | 9/2008 | Yang |
| 2008/0258022 | A1 | 10/2008 | Jaumann et al. |
| 2009/0026329 | A1 | 1/2009 | Terashita |

FOREIGN PATENT DOCUMENTS

| | | |
|---|---|---|
| CN | 01224373.6 | 5/2001 |
| CN | 02213984.2 | 4/2002 |
| CN | 02231128.9 | 4/2002 |
| CN | 02250253 | 12/2003 |
| CN | 03140968.7 | 1/2004 |
| EP | 0 952 383 A2 | 10/1999 |
| FR | 2 203 486 A | 5/1974 |
| FR | 2 205 983 A | 5/1974 |
| WO | WO 98/56538 A | 12/1998 |
| WO | WO 2005/068895 A1 | 7/2005 |
| WO | PCT/US2010/041057 | 7/2010 |

* cited by examiner

MULTI-AXIS PHOTOGRAPHIC TRIPOD HEADS

The present application claims priority to Chinese Patent Application No. 200910040926.2, filed Jul. 7, 2009, the entirety of which is hereby incorporated by reference.

The subject matter of the present application is relevant to that of U.S. patent application Ser. No. 12/709,012 to Liu et al., filed on the same date as this disclosure, entitled "Tripod Head With Folding Handle", the entirety of which is hereby incorporated by reference.

FIELD

The present disclosure relates to tripod heads on support devices, such as tripod heads on tripods for cameras, small telescopes, binoculars, and other apparatus. More particularly, the present disclosure relates to multi-axis photographic tripod heads.

BACKGROUND

Multi-axis tripod heads usually comprise an L-shaped rotational platform with a quick mounting clamp, a bi-directional connecting shaft, a horizontal rotational platform, a tripod head base, and locking mechanisms. The L-shaped rotational platform comprises a horizontal surface and a vertical surface connected to and perpendicular to the horizontal surface. The quick mounting clamp either is directly fixed upon the horizontal surface of the L-shaped rotational platform or is an integral component of the horizontal surface. Thus, the quick mounting clamp cannot move relative to the L-shaped rotational platform.

The bi-directional connecting shaft comprises two rotational axes pointing to two different directions. The first of the two rotational axes aligns with, and coordinates with the rotation of, an internal opening in the bi-directional connecting shaft. The bi-directional connecting shaft, via the first rotational axis, is disposed within the horizontal rotational platform, and can rotate about the first rotational axis. The second of the two rotational axes coordinates with the rotation of an opening in the vertical surface of the L-shaped rotational platform. Therefore, the quick mounting clamp can partially rotate about either of the two rotational axes of the bi-directional connecting shaft. Also, the horizontal rotational platform is movably connected to the tripod head base about an axis perpendicular to the horizontal surface of the tripod head base such that the horizontal rotational platform can rotate 360° about the horizontal surface of the tripod head base. The tripod heads accordingly can rotate in three dimensions.

In the above described tripod heads, the quick mounting clamp together with a camera mounted on the quick mounting clamp can rotate about either of the two rotational axes in the bi-directional connecting shaft, and also about the axis perpendicular to the horizontal surface of the tripod head base. However, because the quick mounting clamp is either fixed upon or integrated with the horizontal surface of the L-shaped rotational platform, the rotation of the quick mounting clamp is restricted by the horizontal rotational platform. Thus, the quick mounting clamp can only achieve partial rotation about the bi-directional connecting shaft such that the rotation of various components of the tripod head is limited and dead photographic angles exist.

BRIEF SUMMARY

In one aspect, a tripod head comprises a tripod mounting component, an angle adjusting component, and a camera mounting component. The angle adjusting component is configured to allow adjustment and locking of the angle between the tripod mounting component and the camera mounting component about first and second perpendicular axes. The camera mounting component is rotatably mounted to the angle adjusting component to allow the camera mounting component to be rotated and locked with respect to the angle adjusting component about a third axis.

In another aspect, a tripod head comprises a quick mounting clamp, a rotational platform rotatably connected to the quick mounting clamp, and a bi-planar connector comprising a first rotational axis and a second rotational axis. The first rotational axis is rotatably connected to the rotational platform. The tripod head further comprises a horizontal rotational platform rotatably connected to the second rotational axis of the bi-planar connector, and a tripod head base rotatably connected to the horizontal rotational platform.

In yet another aspect, a tripod head comprises a first component for mounting a camera, a second component rotatably connected to the first component about a first axis, a third component rotatably connected to the second component about a second axis, a fourth component rotatably connected to the third component about a third axis, and a fifth component for connecting to a tripod. The fifth component rotatably connected to the fourth component about a fourth axis.

DETAILED DESCRIPTION OF THE PREFERRED EMBODIMENTS

Figure 1:
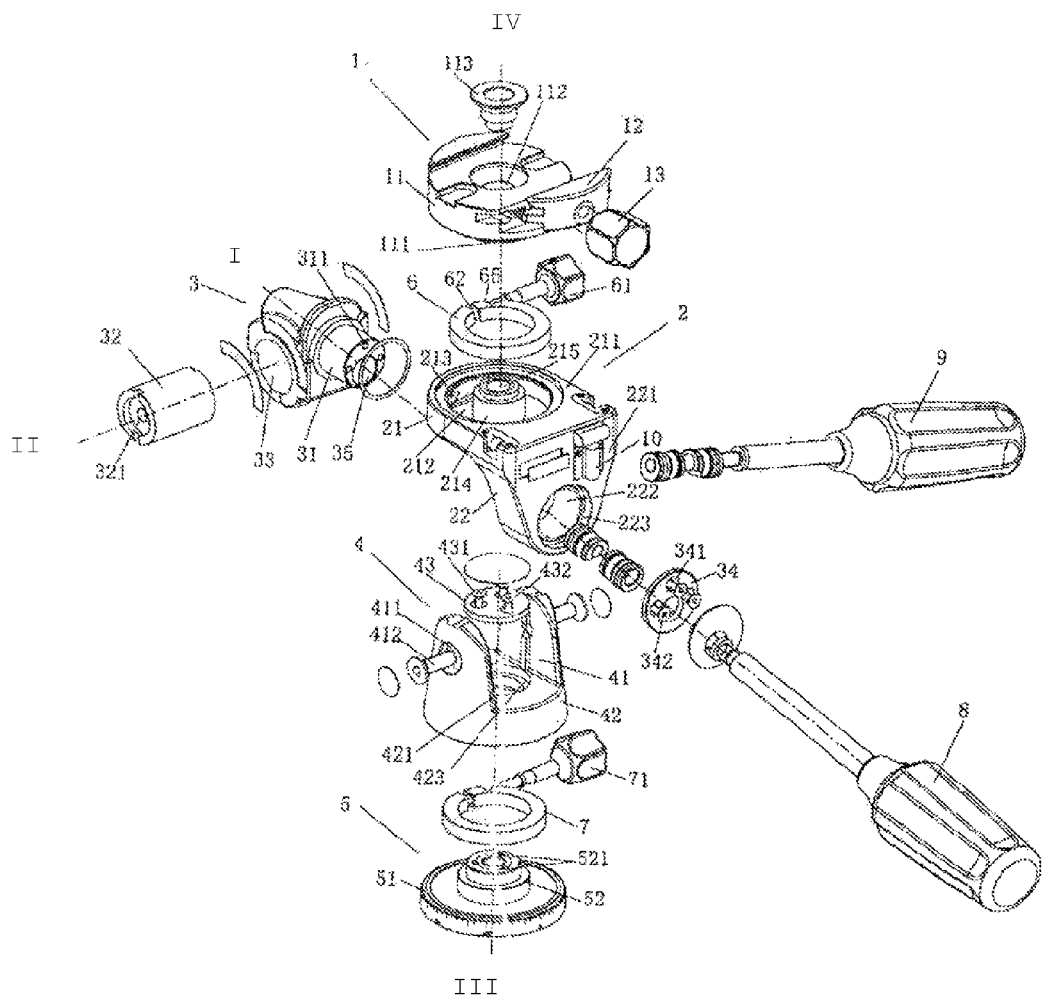
FIG. 1 is an exploded view of a tripod head according to one embodiment.
Figure 2:
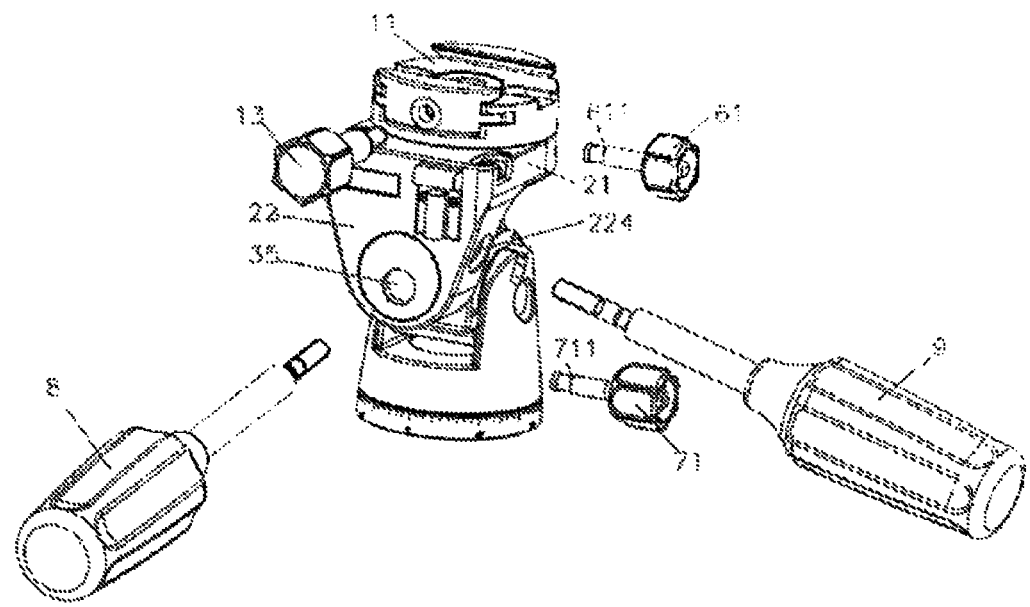
FIG. 2 is an exploded view of the locking mechanisms and handles of the tripod head.
Figure 3:
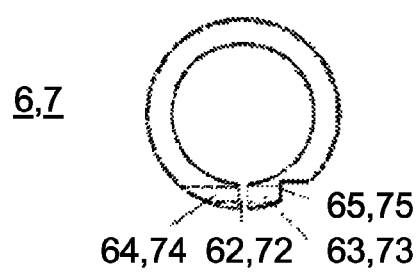
FIG. 3 is a top view of a locking ring of the tripod head.

Referring to FIGS. 1 and 2, a tripod head according to one embodiment comprises a quick mounting clamp (1) serving as a camera mounting component, an L-shaped rotational platform forming a portion of an angle adjusting component assembly with perpendicular axes I and II of rotation (2) rotatably connected to the quick mounting clamp (1), a bi-planar connector (3) rotatably connected to the L-shaped rotational platform (2), a horizontal rotational platform (4) rotatably connected to the bi-directional rotational shaft (3), and a tripod head base (5) rotatably connected to the horizontal rotational platform (4). The tripod head base (5), or a tripod mounting component, is adapted to be connected to a tripod. The camera mounting component may be rotated and locked with respect to the angle adjustment component about a third axis (Axis III in FIG. 1). The camera mounting component may be rotated relative to the angle adjustment component about a fourth axis (Axis IV in FIG. 1).

The quick mounting clamp (1), or a camera mounting component, comprises a quick mounting clamp base (11), a locking mechanism, such as a locking block (12), movably connected to one side of the quick mounting clamp base (11), and a blocking part connected to the other side of the quick mounting clamp base (11). The blocking part faces the locking mechanism (12). The blocking part is either fixed to the quick mounting clamp base (11) or is integral with the quick mounting clamp base (11). The quick mounting clamp base (11) comprises a stepped through-opening (112) in the middle thereof, and a protrusive feature (111) disposed along the periphery of the stepped through-opening (112) and protruding from the surface of the quick mounting clamp base (11) to a direction facing the tripod head base (5). The protrusive feature (111) can assume any shape, such as a circle, a square, a rectangle, a diamond, a triangle, a star, or a polygon. Preferably, the protrusive feature (111) is circular.

Any suitable locking mechanism can be used to mount a camera to or release the camera from the quick mounting clamp (1). In one example, the quick mounting clamp (1) is a trigger type. In another example, as shown in FIG. 1, the quick mounting clamp (1) is a knob type, where releasing and mounting the camera are realized through turning the locking knob (13) to move the locking block (12) laterally on the quick mounting clamp base (11).

An angle adjusting component of the tripod head may comprise the L-shaped rotational platform (2) rotatably connected to the quick mounting clamp (1), the bi-planar connector (3) rotatably connected to the L-shaped rotational platform (2), the horizontal rotational platform (4) rotatably connected to the bi-directional rotational shaft (3), or a combination thereof. Preferably, the angle adjusting component of the tripod head comprises the L-shaped rotational platform (2), the bi-planar connector (3), and the horizontal rotational platform (4).

The L-shaped rotational platform (2) comprises a horizontal part (21) with a horizontal surface (211), and a vertical part (22) with a vertical surface (221) connected and perpendicular to the horizontal part (21). The terms "horizontal" and "vertical" are only relative to each other. The term "perpendicular" means perpendicular or substantially perpendicular. The horizontal part (21) has a recess (212) in the middle thereof. The recess (212) can assume any shape so long as the shape corresponds to the shape of the protrusive feature (111) in the quick mounting clamp base (11). Preferably, the recess (212) has a circular shape. The recess (212) has a vertical surface perpendicular to the horizontal surface (211) and a bottom surface parallel to the horizontal surface (211). The quick mounting clamp (11) via the protrusive feature (111) is rotatably connected to the L-shaped rotational platform (2) at the recess (212).

A locking mechanism is disposed between the quick mounting clamp base (11) and the L-shaped rotational platform (2). Any suitable locking mechanism can be used, such as a knob type or an open locking ring. In one example, the locking mechanism is an open locking ring (6) as shown in FIGS. 1, 2, 3 and 4. The open locking ring (6) comprises a locking ring (6), a locking knob (61), a ring opening (62), an internal opening (63) proximate to one side of the ring opening (62), a platform (65), and a threaded opening (64) at the other side of the ring opening (62). The inner surface of the locking ring (6) is adapted to contact the outer side of the protrusive feature (111) on the quick mounting clamp base (11). The outer surface of the locking ring (6) is adapted to contact the vertical surface of the recess (212). The locking knob (61), through an opening (213) formed on the horizontal part (21) of the L-shaped platform (2) and the internal opening (63) of the locking ring (6), is connected to the threaded opening (64) of the locking ring (6). The locking knob (61) is provided with a step (611), which step (611) is clamped onto the platform (65) of the locking ring (6).

In operation, when the locking knob (61) is turned in one direction, because the step (611) of the locking knob (61) is clamped onto the platform (65) of the locking ring (6), the locking knob (61) is screwed inwardly in the threaded opening (64). Thus both sides of the ring opening (62) of the locking ring (6) are pulled, so that both the ring opening (62) of the locking ring (6) and the locking ring (6) itself are deformed whereby the protrusive feature (111) of the quick mounting clamp base (11) is locked to the L-shaped rotational platform (2). The locked quick mounting clamp (1) cannot rotate about the horizontal part (21) of the L-shaped rotational platform (2). Conversely, if the locking knob (61) is turned in the opposite direction, the protrusive feature (111) is released by the locking ring (6), such that the quick mounting clamp (1) can rotate 360° about the horizontal part (21) of the L-shaped rotational platform (2).

Figure 6:
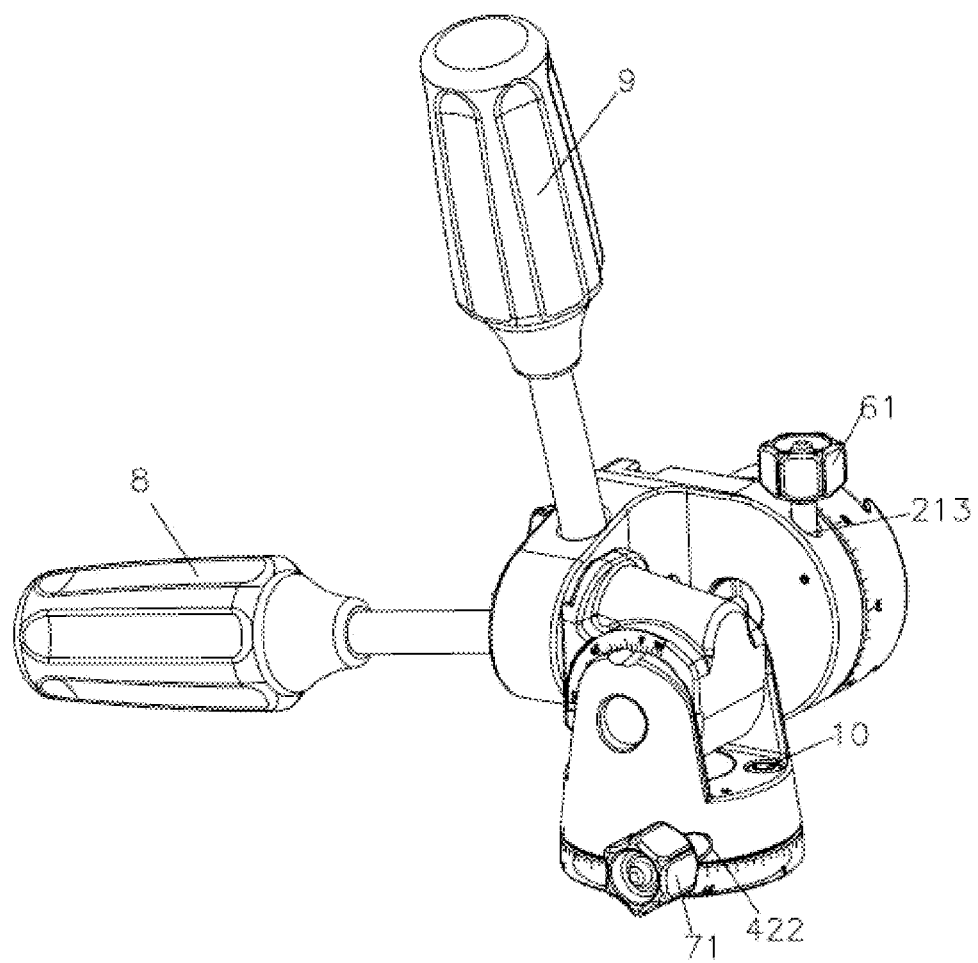
FIG. 6 is a side view of the tripod head in a second operating condition.
Figure 7:
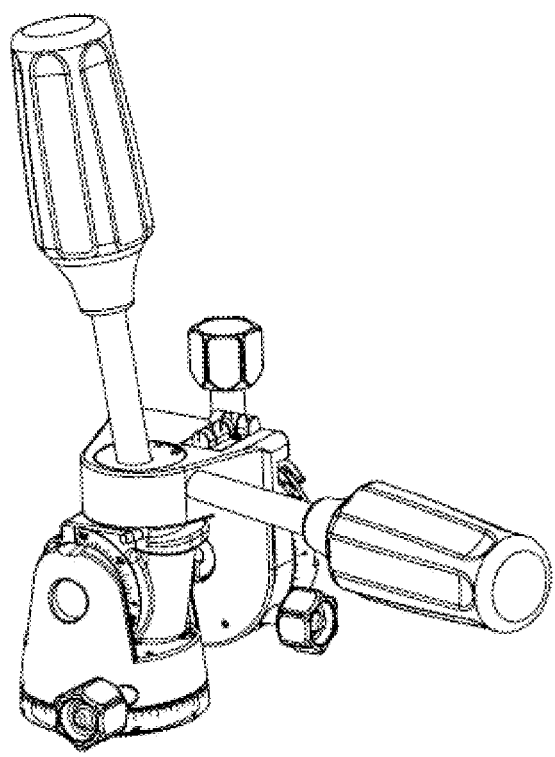
FIG. 7 is a side view of the tripod head in a third operating condition.
Figure 8:
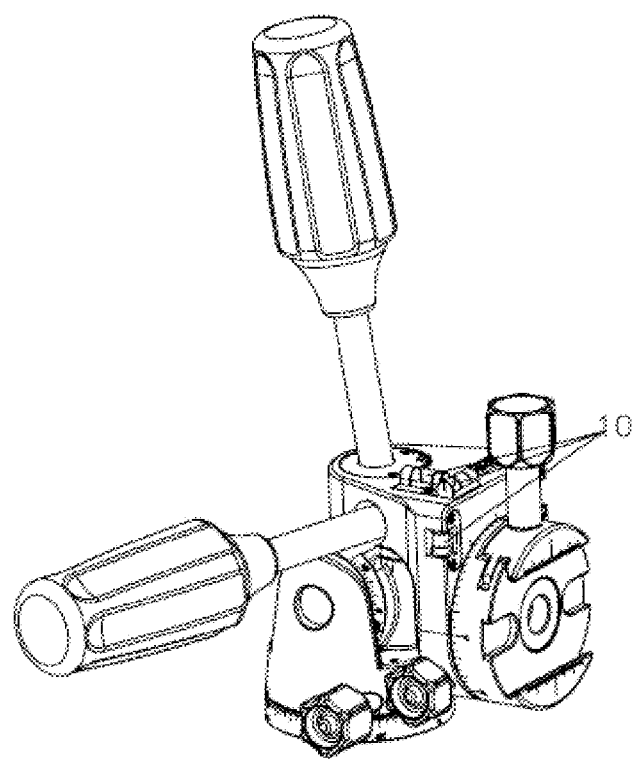
FIG. 8 is a side view of the tripod head in a fourth operating condition.

Referring to FIG. 1, in one operating condition, the quick mounting clamp (1) can rotate 3600 about the horizontal part (21) of the L-shaped rotational platform (2). Referring to FIGS. 6, 7 and 8, in other operating conditions, the rotation of the quick mounting clamp (1) may be limited to a certain angular degree due to the hindrance of the locking knob (61). The angular degree the quick mounting clamp (1) can rotate varies, depending on the length of the locking knob (61). When the locking knob (61) is sufficiently short, the quick mounting clamp (1) can also rotate 3600 under these operating conditions.

Figure 9:
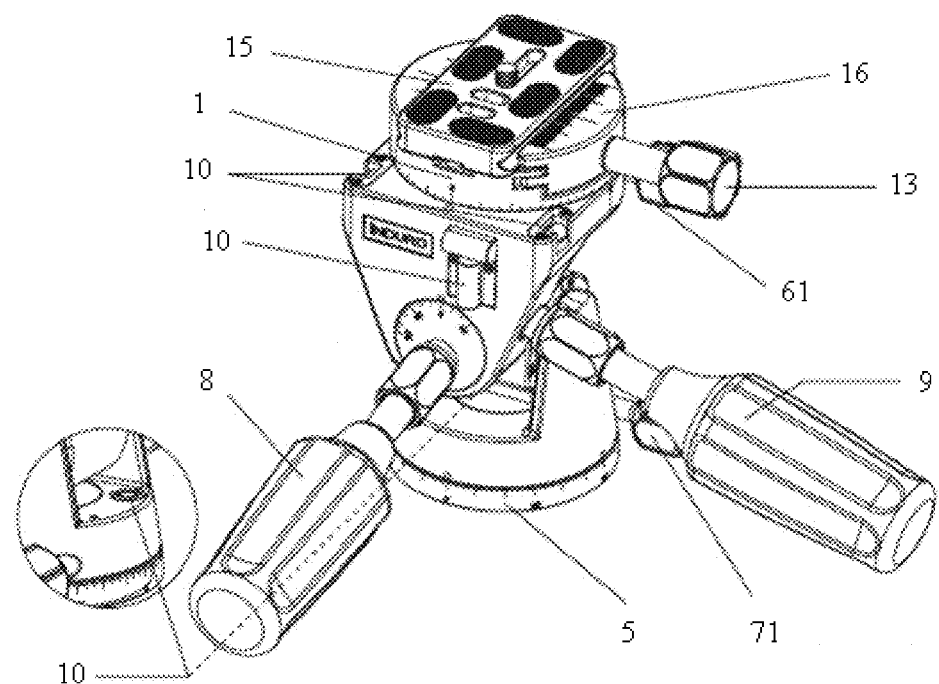
FIG. 9 is a side view of a tripod head according to another embodiment.
Figure 10:
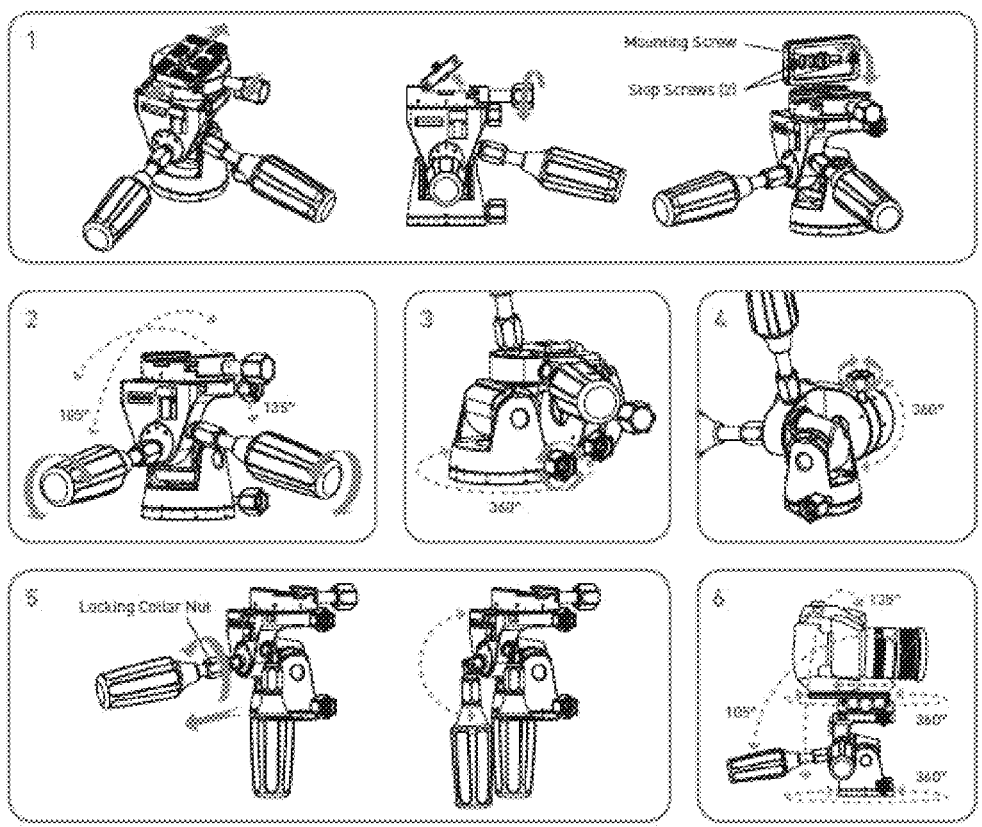
FIG. 10 is a side view of the rotational adjustments of the tripod head of FIG. 9.

Referring to FIGS. 1 and 9, the quick mounting clamp (1) and thus the camera mounted on same can rotate about axes I, II, III and IV, that is, the two rotational axes of the bi-planar connector, the rotational axis perpendicular to the horizontal part (21) of the L-shaped rotational platform (2) where the quick mounting clamp (1) is rotatably connected to the recess (212) of the L-shaped rotational platform (2), and the rotational axis perpendicular to the horizontal surface of the tripod head base (5) where the horizontal rotational platform is rotatably connected to the tripod head base (5). When the tripod head rotates to any position as shown in FIGS. 5, 6, 7 and 8 about axis II, III, and IV, the tripod head can still rotate 360° about axis I. The rotation about any of the axes I, II, II, and IV can be independently adjusted. The tripod heads according to embodiments of the present disclosure facilitate one's landscape selection ability, improve photographic extent, and reduce or even remove dead photographic angles.

Figure 4:
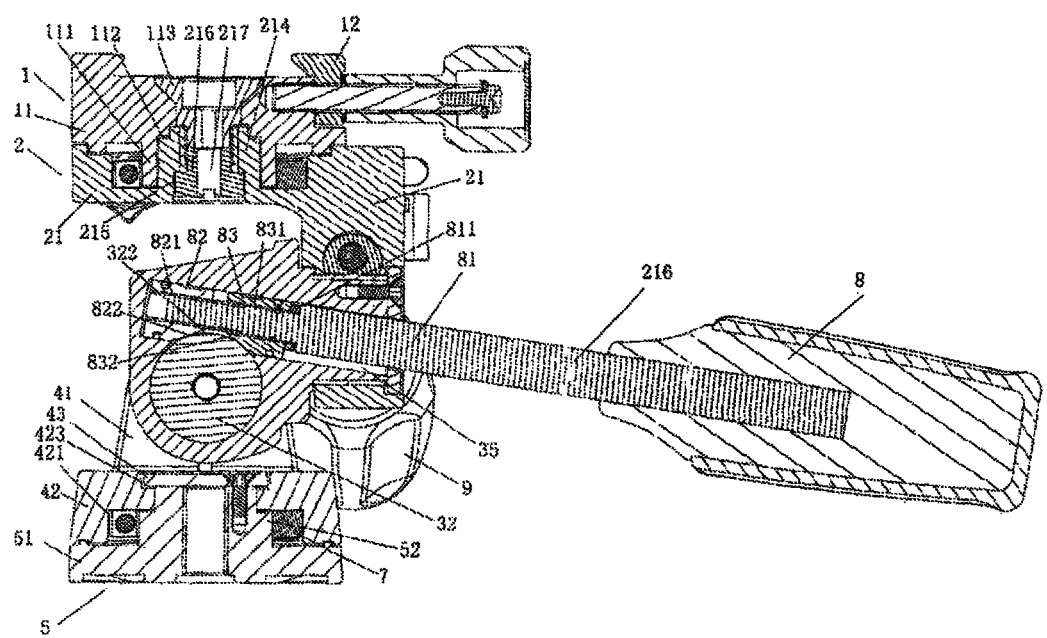
FIG. 4 is a longitudinal sectional view of the tripod head of FIG. 1, about the axial direction perpendicular to the horizontal surface of the tripod head base.

Referring to FIGS. 1 and 4, preferably, the recess (212) disposed on the horizontal part (21) of the L-shaped rotational platform (2) comprises a convex shaft (214) coaxial with the protrusive feature (111) of the quick mounting clamp base (11). The quick mounting clamp base (11) comprises a stepped through-opening (112) also coaxial with the protrusive feature (111) of the quick mounting clamp base (11). The convex shaft (214) of the horizontal part (21) is inserted into the lower end of the stepped through-opening (112). The horizontal part (21) also comprises a threaded stepped through-opening (215) disposed within and coaxial with the convex shaft (214). The stepped through-opening (215) are threaded at the end facing the quick mounting clamp base (11). A step-shaped grub screw (113) is inserted through the stepped through-hole (112) and screwed into the other stepped through-hole (215) from the end of the quick mounting clamp base (11) distal from the L-shaped rotational platform (2). The step-shaped grub screw (113) connects the protrusive feature (111) and the convex shaft (214). Both the convex shaft (214) and the stepped opening (112) can assume any shape so long as they correspond to each other.

Preferably, a conversion screw (216) is screwed into the stepped through-hole (215) from the bottom of the horizontal part (21). The conversion screw (216) comprises a threaded opening (217) at the axial direction thereof. In order to improve the abrasion resistance, the conversion screw (216) is preferably made of stainless steel. In operation, other parts such as the connector of a tripod can be screwed into the threaded opening (217) directly.

Referring to FIGS. 1 and 4 again, the bi-planar connector (3) comprises two rotational axes (31, 32, also shown as II and III) pointing to two different directions. The first (31) of the two rotational axes aligns with, and coordinates with the rotation of, an internal opening (222) disposed in the vertical part (22) of the L-shaped rotational platform (2), such that the vertical part (22) is movably connected to the bi-planar connector (3) via the first rotational axis (31). The first rotational axis (31) is perpendicular to the vertical surface (221) of the vertical part (22). The bi-planar connector (3) may further comprise a fixing board (34). A recess (223) is disposed in the internal opening (222) of the vertical part (22). A plurality of holes (341) is disposed on the fixing board (34). A plurality of threaded holes (311) is disposed on the end of the first rotational axis (31) proximate to the internal opening (222). This end of the first rotational axis (31) is inserted into the internal opening (222) of the vertical part (22) from the side facing the recess (223). The fixing board (34) is clamped onto the recess (223). The first rotational axis (31) is secured to the fixing board (34) via a plurality of screws (342) disposed in the plurality of holes (341) and the plurality of threaded holes (311) such that the L-shaped rotational platform (2) is rotatably fixed on the bi-planar connector (3).

Referring to FIGS. 1, 2 and 4, locking mechanisms are disposed at the rotational connection sections between the first rotational axis (31) and the vertical part (22) of the L-shaped rotational platform (2), and between the second rotational axis (32) and an internal opening (33) disposed in the bi-planar connector (3). Any suitable locking mechanism can be used. For example, the locking mechanism can be a knob type locking device or a locking device with opening type locking blocks.

Preferably, the locking mechanism used is as shown in FIG. 4. For example, the locking mechanism between the second rotational axis (32) and an internal opening (33) comprises a handle (8), a threaded rod (81) disposed in front of the handle (8), corresponding front and rear locking blocks (82, 83). A handle opening (35) is disposed along a tangent line of the second rotational axis (32). A portion of the arc (322) of the second rotational axis (32) on the tangent line connects to the handle opening (35). A clamping portion (811) is disposed at the front end of the threaded rod (81), the front end distal from the handle (8). A threaded opening (821) and a recession opening (831) are disposed in the front locking block (82) and rear locking block (83), respectively. The threaded rod (81) is connected to the front locking block (82) through the handle opening (35) and the recession opening (831) of the rear locking block (83) while the rear locking block (83) is clamped onto the clamping portion (811) of the threaded rod (81). Both the front and rear locking blocks (82, 83) comprise bevel surfaces (822, 832), respectively. The bevel surfaces (822, 832) coordinate with the arc (322).

In operation, when the handle (8) is turned to one direction, the front and rear locking blocks (82, 83) both are pressed towards the second rotational axis (32) of the bi-planar connector (3) so that the bi-planar connector (3) is locked on the second rotational axis (32). When the handle (8) is turned to the opposite direction, the bi-planar connector (3) is released from the second rotational axis (32). Thus the L-shaped rotational platform (2) can rotate about the second rotational axis (32). In one example, the L-shaped rotational platform (2) can rotate about −30°-+90° about the second rotational axis (32). In another example, the L-shaped rotational platform (2) can rotate about −15°-+90° about the second rotational axis (32). The L-shaped rotational platform (2) is at a 0° position when L-shaped rotational platform (2) is level to the platform (51) of the tripod head base (5). The L-shaped rotational platform (2) is at a negative angle position when the handle (8) is turned toward the platform (51) of the tripod head base (5), and at a positive angle position when the handle (8) is turned away from the platform (51) of the tripod head base (5). The position of the L-shaped rotational platform (2) can be controlled at any position within the −30°-+90° range by the handle (8), as shown FIGS. 5, 6, 7 and 8.

Figure 5:
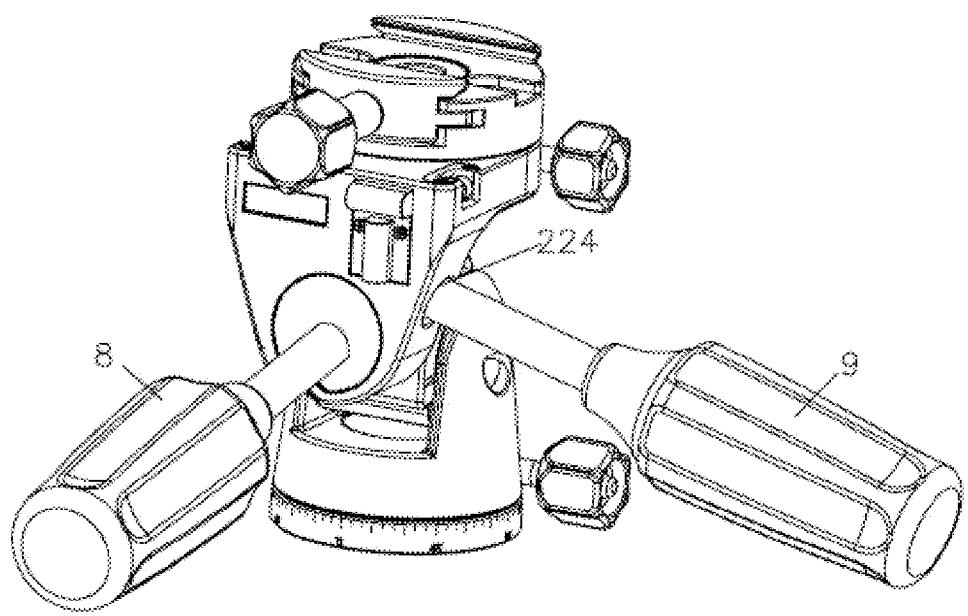
FIG. 5 is a side view of the tripod head in a first operating condition.

Referring to FIGS. 1 and 5, a similar locking mechanism is disposed between the first rotational axis (31) and the vertical part (22) of the L-shaped rotational platform (2). A handle opening (224) is disposed in the vertical part (22). The threaded rod of a handle (9) is connected to first rotational axis (31) through the handle opening (224). In operation, as shown in FIGS. 5, 6, 7 and 8, when the handle (9) is unlocked from the first rotational axis (31), the L-shaped rotational platform (2) can rotate about the first rotational axis (31). In one example, the L-shaped rotational platform (2) can rotate about −30°-+90° about the first rotational axis (31). In another example, the L-shaped rotational platform (2) can rotate about −45°-+90° about the first rotational axis (31). The L-shaped rotational platform (2) is at a 0° position when the L-shaped rotational platform (2) is level to the platform (51) of the tripod head base (5). The L-shaped rotational platform (2) is at a negative angle position when the handle (9) is turned toward the platform (51) of the tripod head base (5), and at a positive angle position when the handle (9) is turned away from the platform (51) of the tripod head base (5). The position of the L-shaped rotational platform (2) can be controlled at any position within the −30°-+90° range by the handle (9). The rotation angles vary depending on the structure of the base (42) of the horizontal rotational platform (4) and length of the handles (8, 9).

Referring to FIGS. 1 and 4 again, the horizontal rotational platform (4) comprises an opening (41) and a base (42). Two threaded openings (321) are disposed on both ends of the second rotational axis (32). Positioning openings (411) are disposed on both sides of the opening (41) of horizontal rotational platform (4). Two positioning screws (412) are screwed into the threaded openings (321) through the positioning openings (411) such that the bi-planar connector (3) is disposed in the opening (41) of the horizontal rotational platform (4) and rotates about the second rotational axis (32).

Referring to FIGS. 1, 3, 4 and 6, the horizontal rotational platform (4) comprises a base (42). An axial opening (421) is disposed in the base (42). The horizontal rotational platform (4) is movably connected to the tripod head base (5) through the axial opening (421), which is perpendicular to the platform (51) of the tripod head base (5). A convex post (52) is disposed on the tripod head base (5). The convex post (52) is coaxial with the axial opening (421). A locking mechanism is disposed at the movable connection between the tripod head base (5) and the base (42) of the horizontal rotational platform (4). The locking mechanism comprises a locking ring (7) and a locking knob (71). The locking ring (7) comprises a ring opening (72), an internal opening (73) proximate to one side of the ring opening (72), a platform (75), and a threaded opening (74) at the other side of the ring opening (72). The inner surface of the locking ring (7) is adapted to contact the outer side of the convex post (52) on the tripod head base (5). The outer surface of the locking ring (7) is adapted to contact the inner surface of the axial opening (421). A radial opening (422) is disposed in the bottom (42) of the horizontal rotational platform (4). The locking knob (71) is disposed in the radial opening (422). The locking knob (71) is screwed into the threaded opening (74) of the locking ring (7) through the radial opening (422) and the internal opening (73) of the locking ring (7). The locking knob (71) is provided with a step (711), which step (711) is clamped onto the platform (75) of the locking ring (7).

In operation, when the locking knob (71) is turned in one direction, because the step (711) of the locking knob (71) is clamped onto the platform (75) of the locking ring (7), the locking knob (71) is screwed inwardly in the threaded opening (74). Thus both sides of the ring opening (72) of the locking ring (7) are pulled, so that both the ring opening (72) of the locking ring (7) and the locking ring (7) itself are deformed whereby the convex post (52) of the tripod head base (5) is locked by the locking ring (7). Thus the horizontal rotational platform (4) cannot rotate relative to the tripod head base (5). Conversely, if the locking knob (71) is turned in the opposite direction, the convex post (52) is released by the locking ring (7), such that the horizontal rotational platform (4) can rotate 360° about the platform (51) of the tripod head base (5).

The horizontal rotational platform (4) may further comprise a fixing board (43). A plurality of holes (431) is disposed on the fixing board (43). A recess (423) is disposed in the axial opening (421) of the bottom (42) of the horizontal rotational platform (4). The fixing board (43) is clamped onto the recess (423). A plurality of threaded holes (521) is disposed on the end of the convex post (52) proximate to the recess (423). The convex post (52) is secured to the fixing board (43) via a plurality of screws (432) disposed in the plurality of holes (431) and the plurality of threaded holes (521) such that the horizontal rotational platform (4) is rotatably fixed on the tripod head base (5).

As shown in FIGS. 6, 8, and 9, the tripod head may comprise one or more level indicators (10). The level indicator (10) can be disposed at any suitable position as needed. In addition, as shown in FIG. 8, graduated lines may be provided at the movable connections at the quick mounting clamp (1), the bi-planar connector (3), and the tripod head base (5) for precise positioning so that one can control rotation angles freely.

Referring to FIGS. 1 and 9, a quick release plate (15) can be secured to the quick mounting clamp (1). Before securing, the quick release plate (15) can slide in the opening between the locking block (12) and the blocking part facing the locking block (12), in a direction perpendicular to the normal of the quick mounting clamp base (11). The locking block (12) may include a quick release plate index (16) for precise position. Graduated lines may also be provided at the quick mounting clamp (1) for precise positioning in order to control the mounting position of the quick release plate (15), and thus a camera mounted on the quick release plate (15), on the quick mounting clamp (1). When used together with long quick release plates or other quick release plate components, such as components allowing nodal point position, the tripod head can provides additional capability to move and position a camera mounted on the quick release plate (15).

Any suitable tripods, for example the reverse foldable tripods described in co-pending U.S. patent application Ser. No. 12/179,148, filed Jul. 24, 2008, co-owned by the assignee of the present application, can be used together with the tripod heads disclosed herein. The entirety of the co-pending U.S. patent application Ser. No. 12/179,148 is hereby incorporated by reference.

Many modifications and other embodiments of the present disclosure will come to mind to one skilled in the art to which the present disclosure pertains having the benefit of the teachings presented in the foregoing description; and it will be apparent to those skilled in the art that variations and modifications of the present disclosure can be made without departing from the scope or spirit of the present disclosure. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A tripod head, comprising
a tripod mounting clamp for mounting a camera comprising a mounting clamp base in the middle thereof and a quick release plate, said clamp base including a cavity through its center portion for rotatably disposing a camera therein;
an L-shaped adjustment component rotatably connected to the tripod mounting clamp component about a first axis;
a bi-planar connector component rotatably connected to the L-shaped adjustment component about a second axis;
a horizontal rotational platform component rotatably connected to the bi-planar connector component about a third axis; and
a tripod head base component for connecting to a tripod, the tripod head base component rotatably connected to the horizontal rotational platform component about a fourth axis,
wherein the quick release plate is laterally adjustable.

2. The tripod head of claim 1, wherein the L-shaped adjustment component is rotatable over 360 degree about said fourth axis regardless of the positions of the L-shaped adjustment component, the bi-planar connector component, the horizontal rotational platform component, and the tripod head base component relative to the first component.

3. The tripod head of claim 1, wherein the tripod mounting clamp component comprises a base, a block positioned on the periphery of said base, and a knob on a side of said base, wherein the knob can be turned to operably adjust said block laterally on the base when turned, and wherein said knob is positioned so that the first component is rotatable over 360 degree about the first axis regardless of the positions of the second component, the bi-planar connector component, the horizontal rotational platform component, and the tripod head base component relative to the first component.

4. The tripod head of claim 1, wherein the tripod head base component is rotatable over 360 degree about said fourth axis.

* * * * *